United States Patent [19]

Gasbarro

[11] 4,207,653
[45] Jun. 17, 1980

[54] AUTOMATIC WING CUTTING APPARATUS

[76] Inventor: Geno N. Gasbarro, 1305 Noe Bixby Rd., Columbus, Ohio 43227

[21] Appl. No.: 5,095

[22] Filed: Jan. 22, 1979

[51] Int. Cl.² .............................................. A22C 21/00
[52] U.S. Cl. .................................... 17/11; 83/411 R; 83/425.3
[58] Field of Search .................... 17/11, 12; 83/425.2, 83/425.3, 435, 466.1, 411 R

[56] References Cited

U.S. PATENT DOCUMENTS

| | | | |
|---|---|---|---|
| 2,047,021 | 7/1936 | Friden | 83/411 R |
| 2,506,985 | 5/1950 | Arnt | 83/435 X |
| 3,349,822 | 10/1967 | Rauth | 83/425.3 X |
| 3,797,338 | 3/1974 | Molnar | 83/411 R X |
| 4,091,503 | 5/1978 | Fox et al. | 17/11 |

Primary Examiner—Willie G. Abercrombie
Attorney, Agent, or Firm—Francis T. Kremblas, Jr.

[57] ABSTRACT

An automatic poultry wing cutting apparatus for selectively severing an individual poultry wing into predetermined pieces which is characterized by a rotatably mounted drum-like wing retaining member provided with a plurality of spaced wing receiving grooves extending generally in an axial direction along the outer surface of the retaining member. A plurality of axially spaced slots are provided which intersect the grooves. Knife means are provided which extend into predetermined portions of said slots and cooperative with a plurality of wing engaging members which are disposed in other preselected slots to bias said wing downwardly against each of said knife means to selectively sever the wing at desired locations.

6 Claims, 5 Drawing Figures

AUTOMATIC WING CUTTING APPARATUS

BACKGROUND

For many years, poultry wings, particularly chicken wings, have been successfully marketed in the fast food and restaurant industry as a special feature commonly referred to as "wing dings". The chicken wing upon being removed from the body at the first major joint is then manually severed at the next major joint and typically severed again at the outer joint to remove the tip portion.

The larger inner most section has been referred to by those in this industry as a "drumette" and the outer portion as a "wingette" and successfully accepted by the consumer as a more highly valued food compared to the whole wing.

While many have attempted to develop an automatic wing severing means, prior to the present invention, these attempts have failed to reach sufficient acceptance to replace the manual cutting procedure presently used in almost all commercial situations.

The problems associated with manual cutting have long been known, such as for example, danger to the person cutting the wing, higher costs of labor and the inefficiency of manual cutting producivity.

A satisfactory automatic cutter which eliminates the danger to the operator, permits one to cut more pieces in a given length of time, and one which consistently cuts the wing cleanly at the desired location has heretofore not been developed to the point of sufficient acceptance to replace the manual procedure.

SUMMARY OF INVENTION

The present invention relates generally to automatic poultry cutting apparatus and particularly to a novel wing cutting apparatus.

A support frame is provided with a novel drum-like wing-retaining means which is rotatably mounted about its longitudinal axis. The outer surface is provided with a plurality of axially extending grooves which are adapted to receive a poultry wing in given configuration. The grooves are circumferentially spaced from one another and are intersected by axially spaced slots.

Knife means and wing engaging members are novelly arranged to firmly position a wing section disposed within a wing receiving groove such that upon rotation of the drum-like member, the wing is forced against the selectively placed cutting edge of each knife means to sever the wing at the desired joint.

Appropriate stripping means are provided at angular locations to assure the severed pieces of the wing fall to a given collection chute for ease of separation and handling.

OBJECTS

It is a primary object of the present invention to provide a cutting apparatus which automatically severs an individual poultry wing into a plurality of preselected pieces.

It is another object of the present invention to provide an apparatus of the type described which increases the production capacity per man-hour compared to manual cutting procedures.

It is another object of the present invention to provide an apparatus of the type described which firmly holds and accurately positions each wing for the severing step in a highly reliable manner.

It is still another object of the present invention to provide a wing cutting apparatus in which the loading step by the operator is in a safe position remote from the cutting position to eliminate operator hazards.

It is a further object of the present invention to provide such a wing cutting apparatus which utilizes a relatively simple construction with few moving parts and operates with reliability requiring relatively simple maintenance procedures.

IN THE DRAWINGS

DETAILED DESCRIPTION

Figure 1:
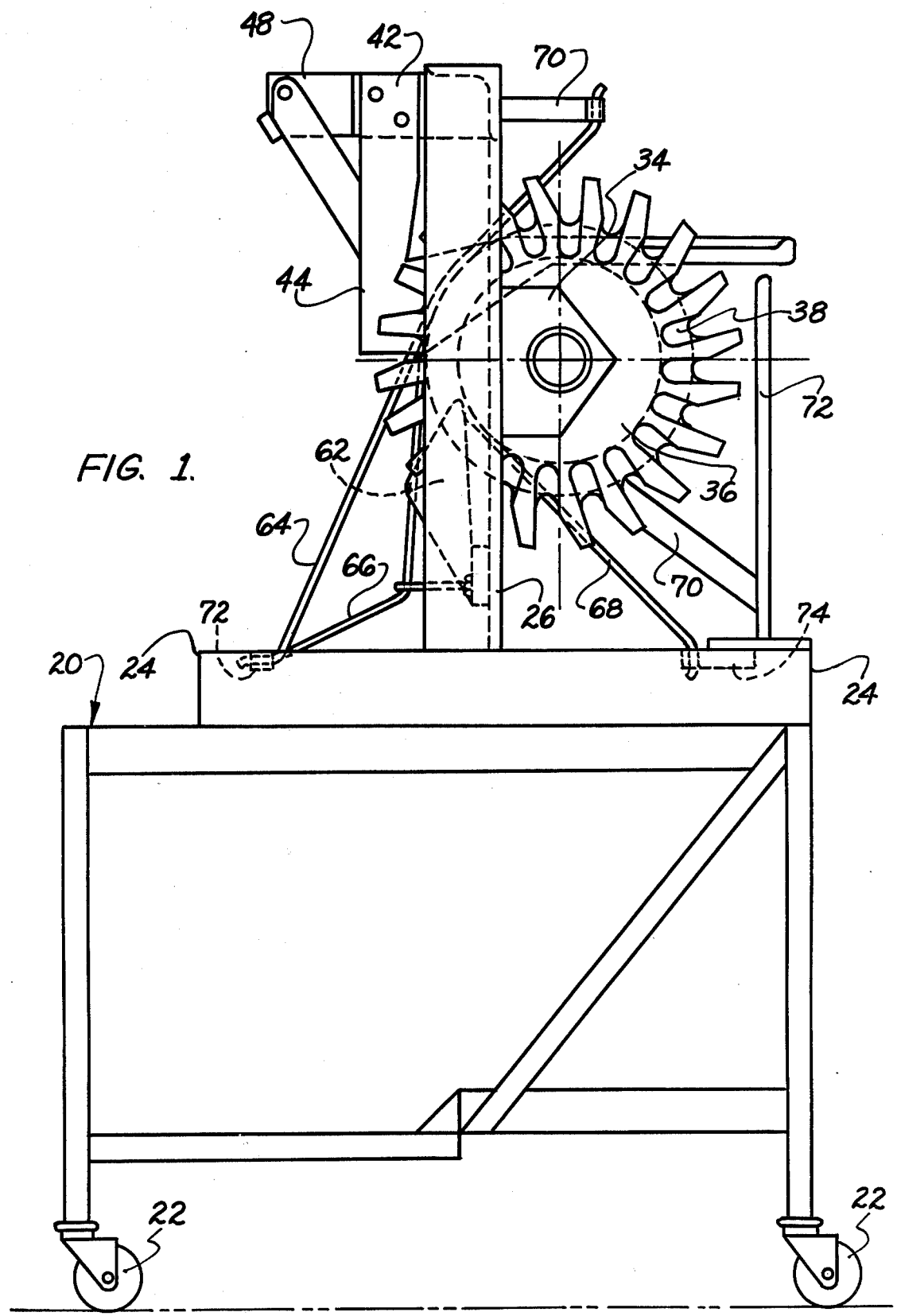
FIG. 1 is a side elevational view of an automated poultry wing cutting apparatus constructed in accordance with the present invention.
Figure 2:
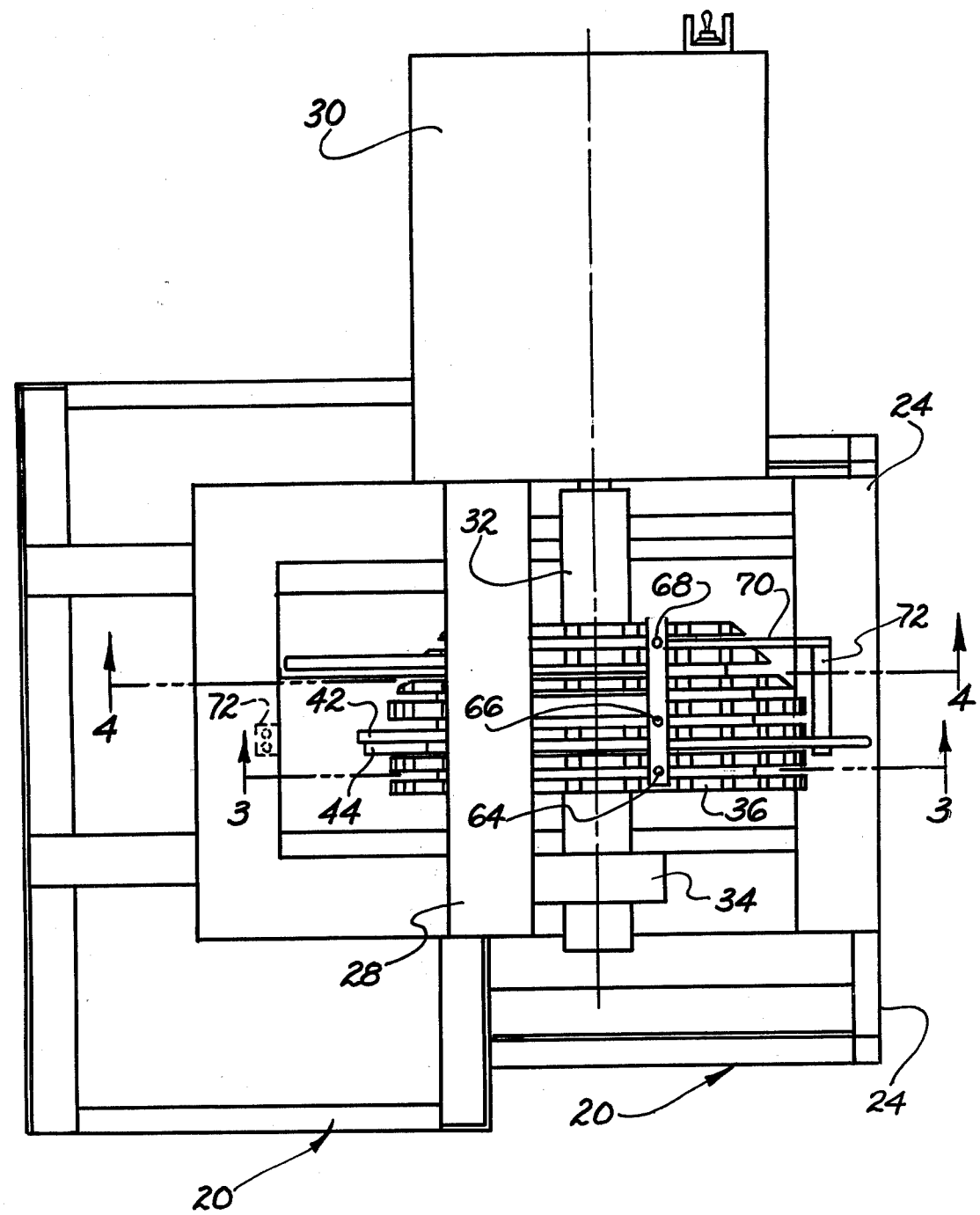
FIG. 2 is a top plan view of the apparatus shown in FIG. 1.
Figure 3:
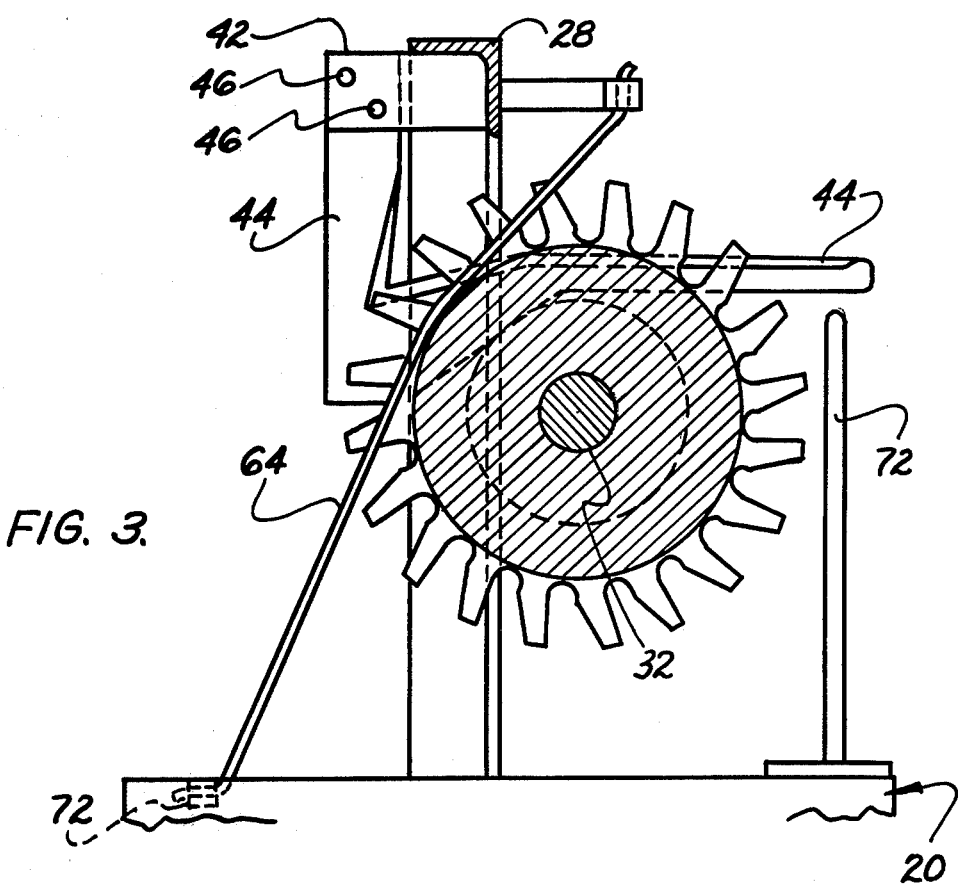
FIG. 3 is a partial side elevational view in section of a portion of the apparatus shown in FIG. 1, the section being taken along line 3—3 in FIG. 2.
Figure 4:
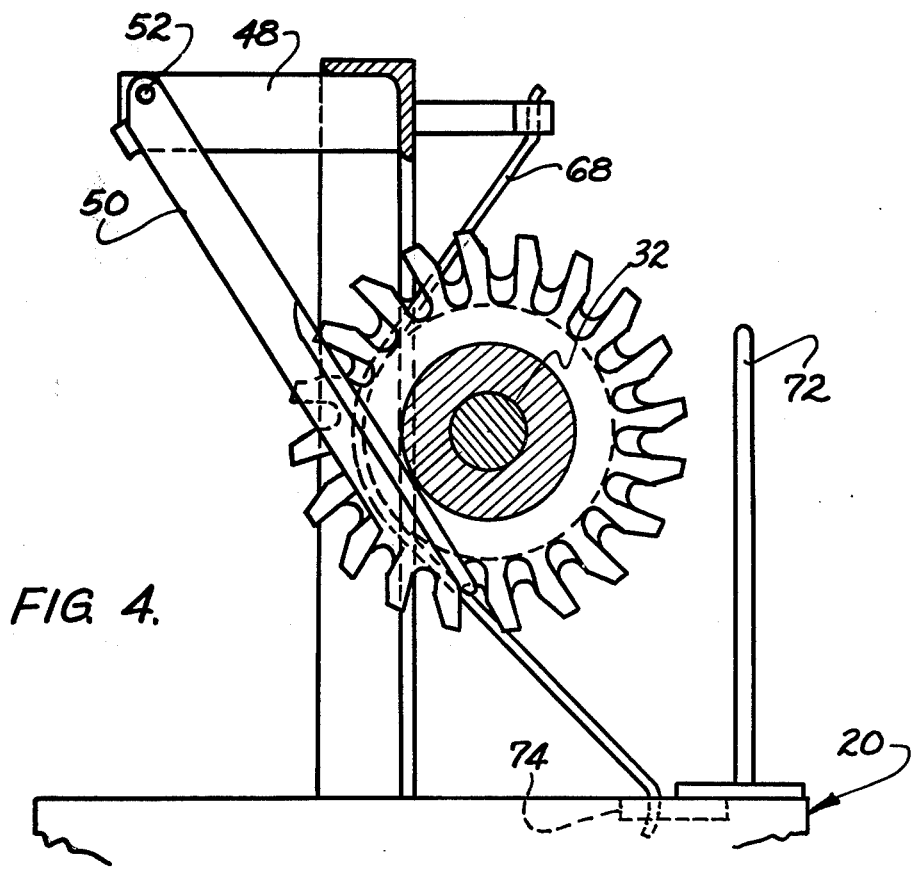
FIG. 4 is a partial side elevational view of the apparatus of the preceding figures, the section being taken along line 4—4 in FIG. 2.

An automated poultry wing cutting apparatus constructed in accordance with the present invention is illustrated in FIGS. 1 and 2 and includes a support frame, indicated generally at 20, which is mounted on caster type wheels 22 for ease of transport from one location to another at the plant site.

Support frame 20 includes an upper base portion 24 provided with a pair of vertically extending beams 26 welded to the base 24 and a horizontal beam 28 fixed to the top of each beam 26.

As best seen in FIG. 2, an electric motor, not shown, is mounted in a protective housing 30, which in turn is fixed in supported relationship to one of the beams 26. A drive shaft 29 is operatively connected to the drive motor and extends outwardly from housing 30 and is fixed to an enlarged shaft 32. Housing 30 may be fixed to beam 26 in any conventionally manner.

Shaft 32, rotatably driven by shaft 29 connected to the electric motor, is journalled in a bearing member 34 which is supported by beam 26 disposed on the opposite side from housing 30. Bearing member 34 is fixed to beam 26 by bolts or the like.

A wing retaining means 36 is mounted on shaft 32 for rotation therewith. The drum-like retaining means 36 preferably is cylindrical for a given portion of its length and includes a frusto-conical portion for the remainder thereof. A plurality of generally axially extending wing receiving grooves 38 are provided in circumferentially spaced relationship from one another along the outer surface of retaining means 36. Each groove 38 is intersected by a plurality of slots 40 which are spaced from one another in an axial direction.

Preferably retaining means 36 is of unitary construction with grooves 38 and slots 40 formed by machining or molded from a material suitable for government food handling regulations.

Figure 5:
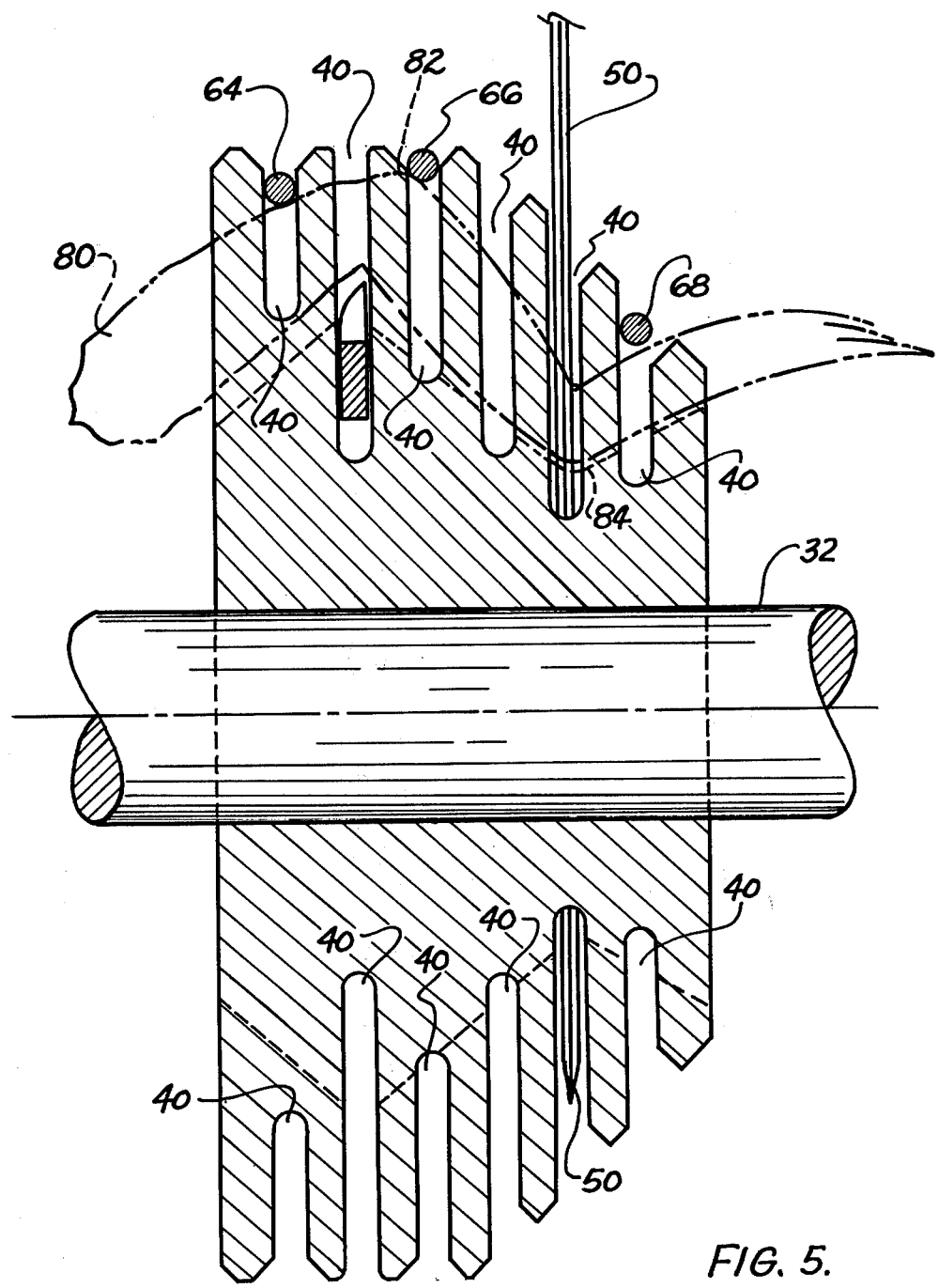
FIG. 5 is a partial diagrammatic front view of the appartus shown in FIG. 1 illustrating the wing retaining means removed from the remainder of the apparatus and the location of the individual knife means and wing engaging members.

The bottom of the grooves 38 are formed to have the general contour of a poultry wing as best seen in FIG. 5 such that the wing when slightly stretched lays within a groove in the configuration shown in FIG. 5.

Support beam 28 carries a first rearwardly extending plate 42 fixed to beam 28. A first knife means 44 is fixed to plate 42 such as by bolts at 46.

A second rearwardly extending plate 48 is fixed to beam 28 and is spaced apart from plate 42 to accomodate a second knife means 50 which is bolted to plate 48 such as at 52 and is braced against downward movement by a flange 56 which is welded to plate 48 and abuts a corner of knife means 50.

A lower horizontally disposed beam 58 is fixed at each end to a corresponding beam 26 and carries a hook-like extension 60 and a triangularly shaped stripping means 62.

A plurality of wing engaging members in the form of resilient bands 64, 66 and 68 are provided and connected at their upper ends within spaced holes 69 provided in a forwardly extending support member 70.

At their lower ends bands 64 and 66 are connected to a horizontally extending member 72 which is fixed to the rear portion of base portion 24. Each of the bands are selectively disposed to have a portion thereof extend into a portion of a selected slot 40 and are biased downwardly toward the bottom of the respective slot at selected angular locations spaced about drum-like retaining means 36. Therefore for example, band 66 is curved downwardly more than band 64 and extends through hooklike extension 60 prior to being connected to member 72.

Similarly, band 68 is curved around retaining means 36 in a portion of one of slots 40 and connected at its lower end to a plate member 74 which is fixed to the forward portion of base portion 24.

Each of the bands 64, 66 and 68 are disposed to extend into a portion of a respective slot 40 such that they include a given portion of their length biased downwardly toward the bottom of their respective slots to circumscribe preselected angular locations with respect to the rotation of retaining means 36.

Further, each of the bands are disposed in a slot 40 in the above described manner so as to be coordinated with the angular location of the cutting edges of knife means 44 and 50 within the respective slots which each of the knife means are disposed.

Further, the general configuration of the grooves 38 and the frusto-conical portion of retaining means 36 is predetermined to aid the desired angular location of the bands 64, 66 and 68 for ease of locating the upper ends at substantially the same height above the retaining means and to facilitate loading of a wing in grooves 38. However, while this is preferred for simplicity, other configurations could be employed with different locations for each band to accomplish the same purposes of biasing a wing in a groove 38 against the engagement with one of the knife means at given prescribed positions.

Referring to the diagrammatic view of FIG. 5, the location of the knife means 44 and 50 and each of the wing engaging bands 64, 66 and 68 relative thereto is illustrated.

The poultry wing 80 disposed in a groove 38 is initially moved toward bands 64 and 66 while riding loose on the horizontally extending portion of knife means 44. As the wing 80 is advanced, it comes into increasing forceful engagement with the bands 64 and 66 and also band 68 and is forced downwardly against the knife means 44.

The configuration of grooves 38 and the location of the knife means 44 and the resilient bands also tends to firmly position the wing such that the wing is forced against the cutting edge of knife means 44 at the location of the first wing joint 82 to sever the wing at that desired location.

As seen in FIG. 1, band 66 is curved downwardly more than band 64 such that is remains in engagement with the right hand portion of the wing as viewed in FIG. 5 at a later stage of rotation compared to band 64. This second wing portion is then being engaged by band 66 and band 68 between the knife means 50. Upon advanced rotation of retaining means 36, the second wing joint 84 is forced downwardly against the cutting edge of knife means 50. In a similar manner, this second cut occurs with the remaining wing portion being firmly positioned in groove 38 on each side of knife means 50 during the severing operation.

As retaining means 36 continues to rotate, the second wing portion which has been severed comes into contact with the leading edge of stripping means 62 which has its leading edge extending into the slot 40 located between the slots 40 into which band 66 and knife means 50 are disposed. This assures that the second joint portion falls free after the cut is made and at a preselected position convenient for collection purposes.

For example, a chute and/or conveyor system could advantageously be employed to catch the cut pieces as they fall free.

Another stripper member is provided in the form of a bar 70 fixed to a vertical member 72 which in turn is fixed to base 24.

Typically, the first cut wing portion or "drumette" will fall free just after the first cut is made, however, if desired another stripper member may be employed, such as for example, in one of the first two slots 40 or on the outside of the retaining means 36 in an angular position selected after the first cut is made.

Bar 70 is disposed near the forward lower portion of retaining means 36 in the slot 40 which also is associated with band 68 to engage the remaining wing tip portion 86 after the two desired cuts have been made. This position was selected to collect the wing tip portions at a separate location since these are treated as a waste by-product for potential use as animal feed.

Vertical member 72 is positioned to extend upwardly to terminate closely spaced to the forward end position of knife means 44 to prevent inadvertent loading of a wing in a groove 38 below the horizontal extending portion of knife means 44.

In operation, the user activates the electric motor in housing 20 to begin the rotation of retaining means 36. Then he simply places a wing portion in one of the grooves 38 at a position on top of the forward horizontal extending portion of knife means 44 with the inner first joint approximately over the upper edge of knife means 44. As the retaining means rotates, he quickly loads another wing in another of the grooves 38 advancing past this loading position.

The first wing portion is carried rearwardly and as it advances it makes contact with bands 64, 66 and finally 68 as it progresses in angular advancement.

The wing engaging bands are disposed so as to increasing engage the wing in greater force transmitting manner which tends to cooperate with the leading horizontal portion of knife means 44 to position the wing as it approaches the sharpened cutting edge portion 45 of knife means 44 and also firmly hold the wing in the groove 38 so that it is forced against the cutting edge to accomplish the severing action.

As the wing advances further, the remaining portion of the wing is then held by bands 66 and 68 in a similar manner as it approaches knife means 50. Similarly, the wing joint portion 84 engages a less sharpened portion of knife means 50 first and tends to position itself during rotation as it slides toward a sharp cutting edge portion. The action of the bands 66 and 68 biasing the wing downward within the groove combined with the movement of rotation of the retaining means causes the joint to engage the cutting edge and be severed.

The cut portions fall free by themselves or by means of the stripper portions previously described.

Of course, the operator merely continues to load a wing into a groove 38 at the loading position while this cutting action takes place. The only limitation of production capacity is the operator's ability to place a wing in a groove 38 during the rotation.

It has been found that with a drum-like retaining means 36 such as described having 20 grooves 38, that a rotational speed of six revolutions per minute is suitable to obtain near capacity performance from one manual operator.

While all grooves 38 may not been able to be loaded, the additional grooves permit an operator to load as fast as he can pick up a wing and merely place it in a groove as it passes the loading position. Theorectically, this permits 120 wings per minute to be cut, however, initial field tests indicate that the average operator can readily load in the range of from 70 to approximately 100 wings per minute.

This represents a rather drammatic two to three fold increase over the average capacity achieved by conventional manual cutting operations.

Of course, retaining means 36 could be constructed on a larger basis having more grooves if desired, with a slower rotating action to attempt to achieve maximum production.

Clearly, the limitation of production capacity is the operator's ability to place wings in the grooves as fast as possible. The construction of the present invention including the contour of the grooves and the shape and position of the forwardly extending portion of knife means 44 tends to make proper loading of a wing relatively easy. Very precise positioning is not necessary. Further, the construction of the retaining means 36 in cooperation with the wing engaging members 64, 66 and 68 and the positioning of the knife means 44 and 50 tends to assure self-positioning of the wing in a stable manner as the wing rotates in the groove to obtain the cuts in the desired location.

It should also be noted that slots 40 need not necessarily be formed completely around the circumference if a somewhat different placement or form of engaging bands are employed. For example, bands 64, 66 and 68 could be changed to another equivalent form of means to firmly engage the wing and bias the wing within a groove 38 which would not require slots 40 such as leaf springs or resilient strips fashioned to circumscribe selected areas of rotation and fixed to the frame. However resilient bands such as shown are believed to be the most practical and convenient form to accomplish the intended results.

What is claimed is:

1. An automated poultry wing cutting apparatus comprising, in combination, a support frame; a wing retaining means including a drum-like member rotatably mounted on said support frame and provided with a plurality of axially extending wing receiving grooves disposed on the outer surface and circumferentially spaced from one another, and a plurality of slots transversely intersecting said grooves and axially spaced from one another; knife means mounted on said support frame and having a cutting edge disposed within a predetermined portion of one of said slots at a given angular position; and at least a pair of wing engaging members mounted to said support frame, and a respective one having a portion extending into and biased towards the bottom of a portion of a different one of said slots at an angular position near the cutting edge of said knife means to engage in force-transmitting relationship a poultry wing carried in one of said grooves as said cutting edge engages said wing at a predetermined location; and drive means operatively connected to said wing retaining means causing rotation about its axis.

2. The apparatus defined in claim 1 wherein said wing engaging members comprise a flexible and resilient material.

3. The apparatus defined in claim 1 including a second knife means mounted on said support frame and having a cutting edge extending within a different one of said slots at an angularly spaced relationship relative to said first knife means; and at least a third wing engaging member mounted to said support frame and having a portion extending within a different slot relative to said other wing engaging members and biased towards a portion of the bottom of said slot to engage a predetermined portion of a poultry wing in force transmitting relationship to cooperate with one of said other wing engaging members to retain a portion of said wing in said groove as said cutting edge of said second knife means engages said wing portion at a preselected location.

4. The apparatus defined in claim 3 wherein said wing engaging members comprise a flexible and resilient material.

5. An automated poultry cutting apparatus, comprising in combination, a support frame; a wing retaining means including a drum-like member rotatably mounted on said support frame and including a plurality of wing receiving grooves circumferentially spaced from one another and extending in an axial direction along the outer surface of said drum-like member and a plurality of slots intersecting said grooves and axially spaced from one another; a first knife means mounted on said support frame and disposed to extend into a portion of a selected one of said slots; a second knife means mounted on said support frame and extending within a portion of a different one of said slots and disposed at a different angular position relative to said first knife means; a plurality of wing engaging members mounted to said support means, a respective one of said members being biased downwardly toward the bottom of a portion of a respective different one of said slots at an angular position near a selected one of said knife means to retain a predetermined portion of a poultry wing being advanced in a given groove during rotation of said drum-like member as said wing portion engages the cutting edge of a respective one of said knife means.

6. In an automated poultry cutting apparatus, the combination of a frame means; a rotatably mounted drum-like wing-retaining means including a plurality of circumferentially spaced openings extending in an axial direction along the outer surface of said retaining means and provided with a predetermined contour adapted to receive a poultry wing in a predetermined position; a plurality of slots intersecting said grooves and axially spaced from one another; at least a first knife means mounted on said frame means in a fixed position and including a cutting edge portion disposed in association with one of said slots to engage a wing carried in one of said openings at a predetermined angular location as said grooves are advanced during rotation of said retaining means; and a plurality of wing engaging members associated with certain of said slots disposed adjacent to said slot associated with said knife means to engage in force transmitting relationship a wing portion disposed in one of said grooves at a predetermined angular position during rotation of said retaining means to bias said wing portion against movement away from said cutting edge upon engagement with said cutting edge; and drive means operatively connected to said retaining means causing said retaining means to rotate about its axis.

* * * * *